US007281103B2

(12) United States Patent
Tanaka et al.

(10) Patent No.: US 7,281,103 B2
(45) Date of Patent: Oct. 9, 2007

(54) MICROCOMPUTER WITH A SECURITY FUNCTION FOR ACCESSING A PROGRAM STORAGE MEMORY (75) Inventors: Masatoshi Tanaka, Kanagawa (JP); Yosuke Matsushita, Kanagawa (JP); Kazuhiko Akiyama, Shizuoka (JP)

(73) Assignees: Kabushiki Kaisha Toshiba, Tokyo (JP); Toshiba Carrier Corporation, Tokyo-To (JP)

( * ) Notice: Subject to any disclaimer, the term of this patent is extended or adjusted under 35 U.S.C. 154(b) by 382 days.

(21) Appl. No.: 10/951,642

(22) Filed: Sep. 29, 2004

(65) Prior Publication Data

US 2005/0102478 A1 May 12, 2005

(30) Foreign Application Priority Data

Oct. 1, 2003 (JP) ............................. 2003-343061

(51) Int. Cl.
    *G06F 12/00* (2006.01)
(52) U.S. Cl. ...................................... 711/163
(58) Field of Classification Search ................ 711/163, 711/164; 713/202
    See application file for complete search history.

(56) References Cited

U.S. PATENT DOCUMENTS 5,890,189 A    3/1999  Nozue et al.
6,009,453 A   12/1999  Sakaki
6,058,477 A *  5/2000  Kusakabe et al. .......... 713/169
6,453,397 B1   9/2002  Okuda
6,508,400 B1 * 1/2003  Ishifuji et al. ............... 235/382
6,527,177 B1 * 3/2003  Ishifuji et al. ............... 235/382
6,747,546 B1 * 6/2004  Hikita et al. .............. 340/10.31
2002/0133680 A1 * 9/2002  Rosenquist et al. ......... 711/163
2003/0149854 A1 * 8/2003  Yoshino et al. ............. 711/173

FOREIGN PATENT DOCUMENTS

| JP | 2002-149623   | 5/2002 |
| JP | 2002-149624   | 5/2002 |
| JP | 2002-149625   | 5/2002 |
| JP | 2002-149626   | 5/2002 |
| JP | 2002-269065   | 9/2002 |
| KR | 2002-0036717  | 5/2002 |
| KR | 2002-0072182 A| 9/2002 |

* cited by examiner

*Primary Examiner*—Hiep T. Nguyen
(74) *Attorney, Agent, or Firm*—Oblon, Spivak, McClelland, Maier & Neustadt, P.C.

(57) ABSTRACT

A microcomputer comprises: a memory which stores a predetermined program; a CPU which reads the program stored in the memory based on a predetermined instruction to perform a predetermined calculation; and a read controller which controls reading of the program from the memory, and the microcomputer further comprises: a plurality of memory areas disposed in the memory and having distinction bits; distinction unit for distinguishing the memory areas using the different distinction bits; and read access controller for prohibiting the reading from the memory area in which another program is stored based on a distinction result of the distinction unit.

18 Claims, 13 Drawing Sheets

(*) INSTRUCTION CODE 1: DATA READ INSTRUCTION OF ADDRESS OF CERTAIN BLK 2 PROGRAMMED IN ADDRESS OF CERTAIN BLK 1

FIG. 7

(*) INSTRUCTION CODE 1: DATA READ INSTRUCTION OF ADDRESS OF CERTAIN BLK 2 PROGRAMMED IN ADDRESS OF CERTAIN BLK 1

ID_A security function for accessing a program storage memory

MICROCOMPUTER WITH A SECURITY FUNCTION FOR ACCESSING A PROGRAM STORAGE MEMORY

CROSS REFERENCE TO RELATED APPLICATION

This application is based upon and claims the benefit of priority under 35 U.S.C. 119 to the prior Japanese Patent Applications No. 2003-343061, filed on Oct. 1, 2003, the entire contents of which are incorporated herein by reference.

BACKGROUND

The present invention relates to microcomputers each comprising a microprocessor and a program storage memory, particularly to microcomputers capable of holding security among users in installing different programs by a plurality of users.

In recent years, situations have increased in which a plurality of programs are installed in memories beforehand and provided in manufacturing and shipping microcomputers. Since copyrights of the programs installed beforehand in this situation are held by a plurality of different software sellers, it is a problem whether or not the securities of the programs can be secured in successively installing the microcomputers via a plurality of program users.

In Japanese Patent Application Laid-Open No. 7-200413, a microcomputer has been described in which the program memories can be additionally disposed in the outside and in which reading from a built-in address is prohibited in a case where an address for fetching an instruction does not exist in a built-in address space.

In Japanese Patent Application Laid-Open No. 8-272625, a multi-program execution control device and method have been described comprising: setting means for setting at least one of a prohibiting area in which accesses from other programs are prohibited, and a permitting area in which the accesses from the other programs are permitted in each program.

In Japanese Patent Application Laid-Open No. 2000-181898, a microcomputer has been described comprising: a flash memory comprising a first programmable region and a second region to designate whether or not programming is possible with respect to the first region; and a microprocessor which refers to the second region of the flash memory to judge whether or not the programming of the first region can be executed at a time when there is a request for programming from the outside.

In Japanese Patent Application Laid-Open No. 2002-7214, an information processing apparatus has been described comprising: rewrite control means, started by a CPU with generation of an interruption signal, for prohibiting a nonvolatile storage device from being rewritten in a case where an access by software is unjust.

All of these documents Japanese Patent Application Laid-Open Nos. 7-200413, 8-272625, 2000-181898, and 2002-7214 describe the microcomputer provided with a program security function. In the microcomputer, judgment means is disposed for judging whether or not a storage place of an instruction code is a specific memory area with respect to the instruction code for executing the access, and it has been judged whether or not data can be read from the memory using the judgment means at an instruction execution time.

Figure 13:
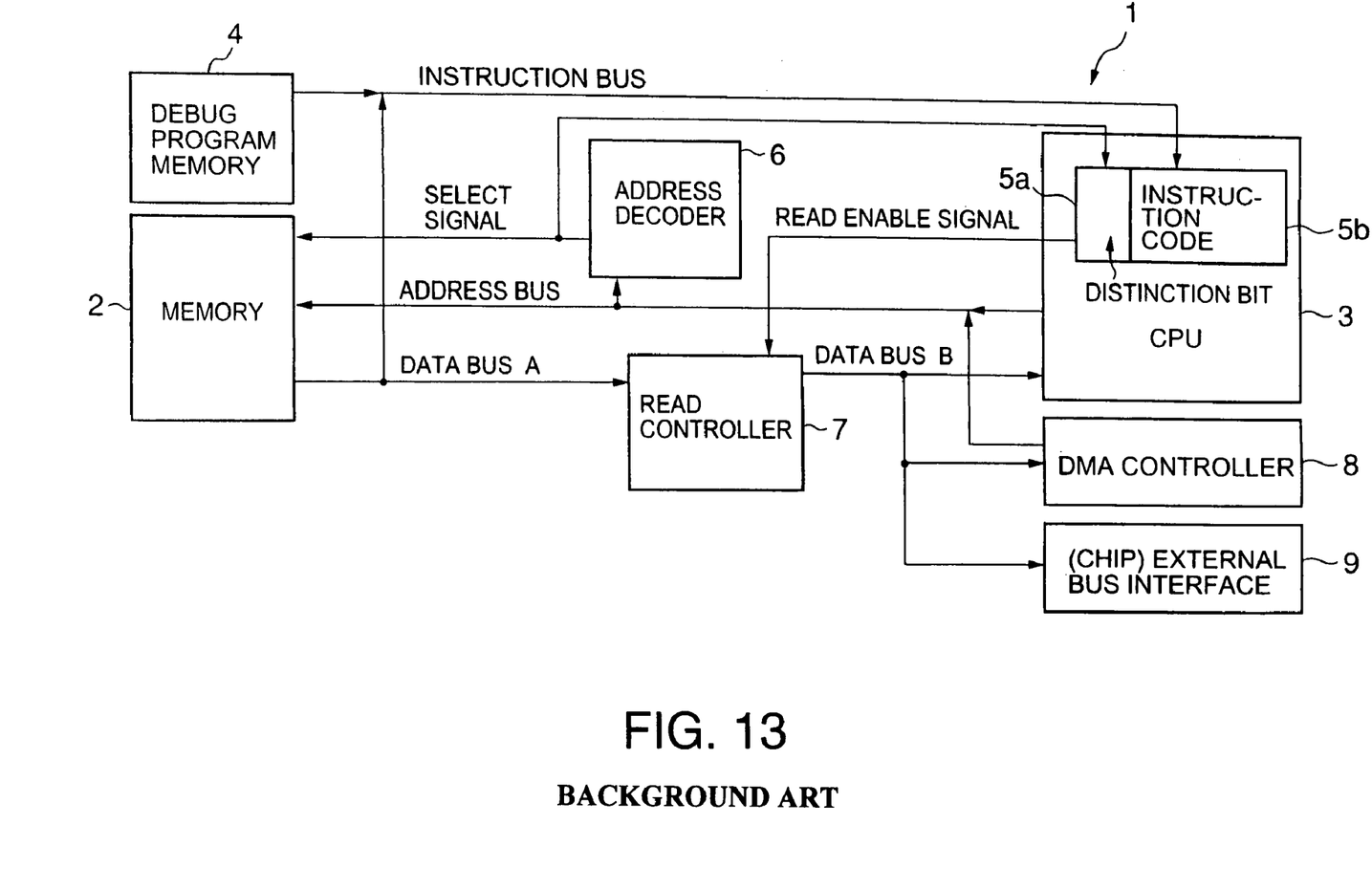
FIG. 13 is a block diagram showing a constitution of a conventional microcomputer.

That is, a conventional microcomputer 1 shown in FIG. 13 comprises: a memory 2 to store a predetermined program; a central processing unit (hereinafter referred to as the CPU) 3 which executes a predetermined calculation based on input of a predetermined instruction code; a debug program memory 4 which supplies a debug program to the CPU 1 via an instruction bus; a distinction bit 5*a* and an instruction code 5*b* processed in the CPU 3; an address decoder 6 which manages an address of the program stored in the memory 2; and a read controller 7 which controls the reading of the program from the memory based on a read enable signal from the CPU 3.

The microcomputer 1 further comprises: a direct memory access (hereinafter referred to as the DMA) controller 8 which controls a direct access into an internal memory from a memory outside a system; and a chip external bus interface 9 which enables the access to the outside of a chip.

In the conventional microcomputer 1, the distinction bit 5*a* for distinguishing a memory area of the memory 2 corresponding to the storage place of the instruction code is applied to the instruction code 5*b* for executing the access, supplied to the CPU 3 via the instruction bus. When the distinction bit 5*a* is disposed as distinction unit of this instruction code storage place, the program or data stored in an internal memory of a computer system can be protected, and the program security function has been tentatively performed.

However, in the conventional microcomputer, only one memory area to store the program is disposed in the memory. Only one distinction bit is disposed as the distinction unit of the instruction code storage place. Therefore, even when a plurality of program providers install a plurality of programs with respect to one memory, one memory area is accessed to install the program into the internal memory making full use of one distinction bit.

Therefore, when the distinction bit is matched, and the access to the memory is permitted, the program stored by another program provider can be read, and a basic program security function is secured with respect to the internal memory in the computer system. However, there has been a problem that the program security function cannot be secured with respect to the already installed specific program.

That is, in recent years, a memory capacity has increased, and functions have been multiplied by enhancement of a performance. On the other hand, it has been very important to shorten a development period because of a speed of a product cycle. Therefore, a situation in which each core technique has to be entrusted to each technical expert has increased in mounting a plurality of sophisticated core technique in a short development period. In this situation, each of software has to be successively programmed into the memory. However, to hold mutual secrecy of software, in the case of the microcomputer having only one distinction bit as in a conventional example, there has been a problem that there is not any method other than a method of controlling the access by mutual communication using a plurality of microcomputers, or using an operating system (OS).

In this situation, even though each software should be programmed or installed into the memory, in the case where only one distinction bit is used, when the previous seller installs a specific program into a memory, and the next seller receives the memory, is permitted to access the memory by the same distinction bit, and installs a different program, there has been a problem that contents of the already stored program are read by a different program seller.

To that end, there has been a general technique to protect secrecy of software, either by controlling accesses of a plurality of microcomputers each of which has only one distinction bit same as the prior art through mutual communications, or by using the operating system (OS).

Therefore, there is desired a microcomputer capable of securing the security between programs even in a case where different storing persons install a plurality of different programs in the memory.

SUMMARY OF THE INVENTION

According to a basic constitution, there is provided a microcomputer comprising: a memory which stores a predetermined program; a CPU which reads the program stored in the memory based on a predetermined instruction to perform a predetermined calculation; and a read controller which controls reading of the program from the memory, the microcomputer further comprising: a plurality of memory areas disposed in the memory and each having a distinction bit; a distinction unit for distinguishing the memory areas using the different distinction bits; and a read access controller for prohibiting the reading from the memory area in which another program is stored based on a distinction result of the distinction unit.

DESCRIPTION OF THE EMBODIMENTS

Embodiments of a microcomputer will be described hereinafter in detail with reference to the accompanying drawings.

First Embodiment

First, a microcomputer according to a first embodiment showing a basic concept will be described.

Figure 1:
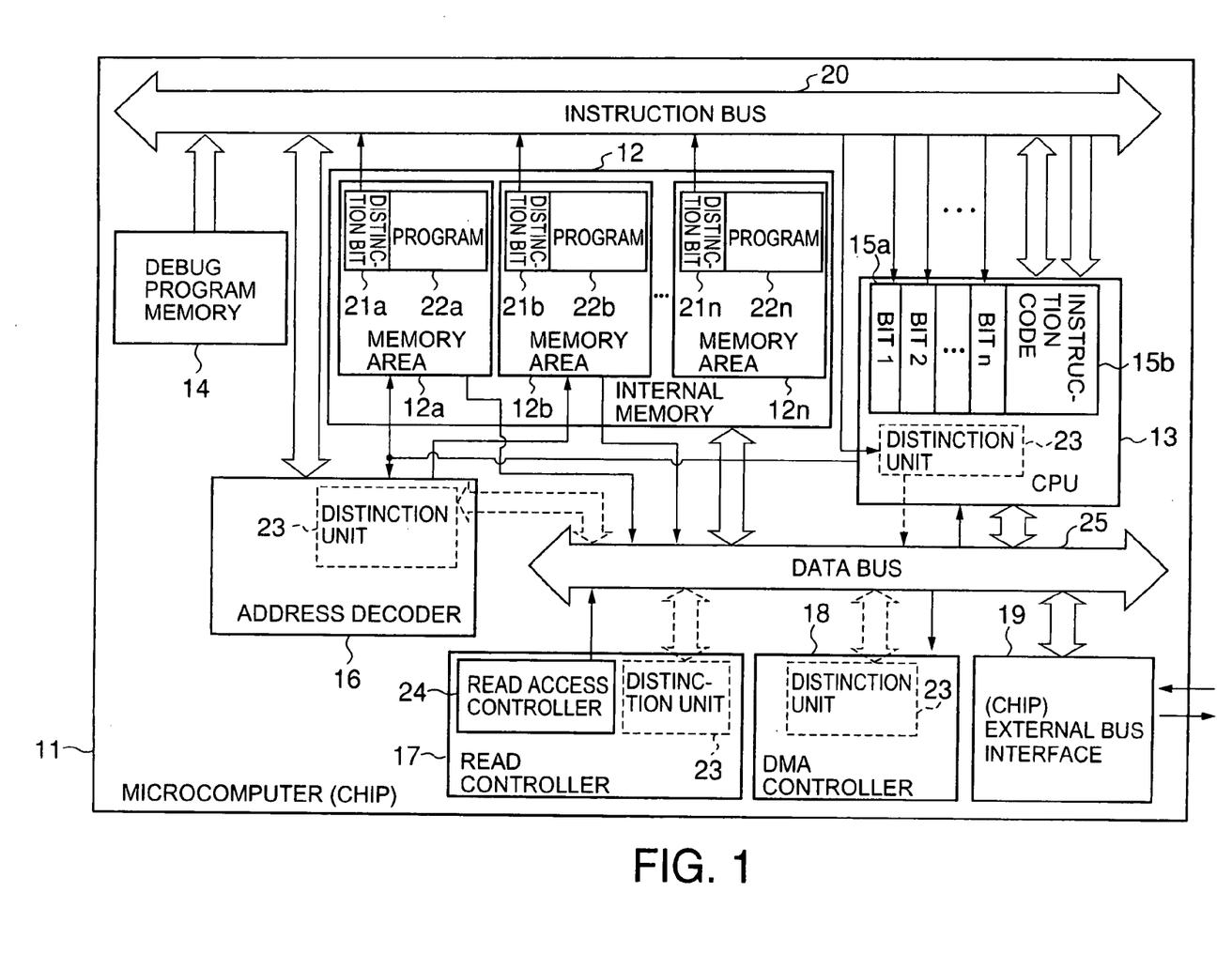
FIG. 1 is a block diagram showing a constitution of a microcomputer according to a first embodiment.

In FIG. 1, a microcomputer 11 according to the first embodiment comprises: an internal memory 12 which stores a predetermined program for each of a plurality of memory areas; a CPU 13 which reads the program stored in the internal memory 12 based on a predetermined instruction to perform a predetermined calculation; an address decoder 16 which permits an access to an address space of the memory 12 by an address at a time when the instruction is received; and a read controller 17 which controls reading of the program from the memory 12 at a time when the access to the memory 12 is permitted, and is entirely formed into a chip.

The microcomputer 11 having this basic constitution comprises: a plurality of memory areas 12a, 12b, . . . , 12n disposed in the internal memory 12 to store a plurality of programs 22a, 22b, . . . , 22n having distinction bits (e.g., addresses, etc.) 21a, 21b, . . . , 21n which differ with programs by programs; a distinction unit 23 for distinguishing the memory areas 12a, 12b, . . . , 12n in which the respective programs 22a, 22b, . . . , 22n are stored using the distinction bits 21a, 21b, . . . , 21n which differ with the respective programs 22a, 22b, . . . , 22n; and a read access controller 24 for controlling the reading of the program in such a manner as to permit an access to the memory area in which the program is stored only when the memory area is judged to belong to the program corresponding to each of the distinction bits 21a, 21b, . . . , 21n, and prohibit an access to the memory areas 12b to 12n in which the other programs 22b to 22n are stored, for example, by the distinction bit 21a for the certain program 22a.

The other constitutions of the microcomputer 11 comprise: the CPU 13 which performs various types of processes with respect to input instructions; distinction bits 15a and an instruction code 15b processed in the CPU 13; the address decoder 16 which manages addresses of the programs 22a to 22n stored in the memory areas 12a to 12n in the memory 12 in the same manner as in the conventional microcomputer 1; and the read controller 17 which controls the reading of the program from the memory 12 based on a read enable signal from the CPU 13.

The microcomputer 11 further comprises: a direct memory access (DMA) controller 18 which controls a direct access from a memory outside the system to the internal memory; a chip external bus interface 19 which makes possible the access to the outside of the chip; an instruction bus 20 which transmits the instructions in the microcomputer 11; and a data bus 25 which is an intermediary of transmission/reception of data between the internal memory 12 and the CPU 13. It is to be noted that the read access controller 24 is disposed in the read controller 17, but the distinction unit 23 may be disposed in the CPU 13, or in one of the address decoder 16, the read controller 17, and DMA controller 18 as shown by dotted line in FIG. 1.

Second Embodiment

Figure 2:
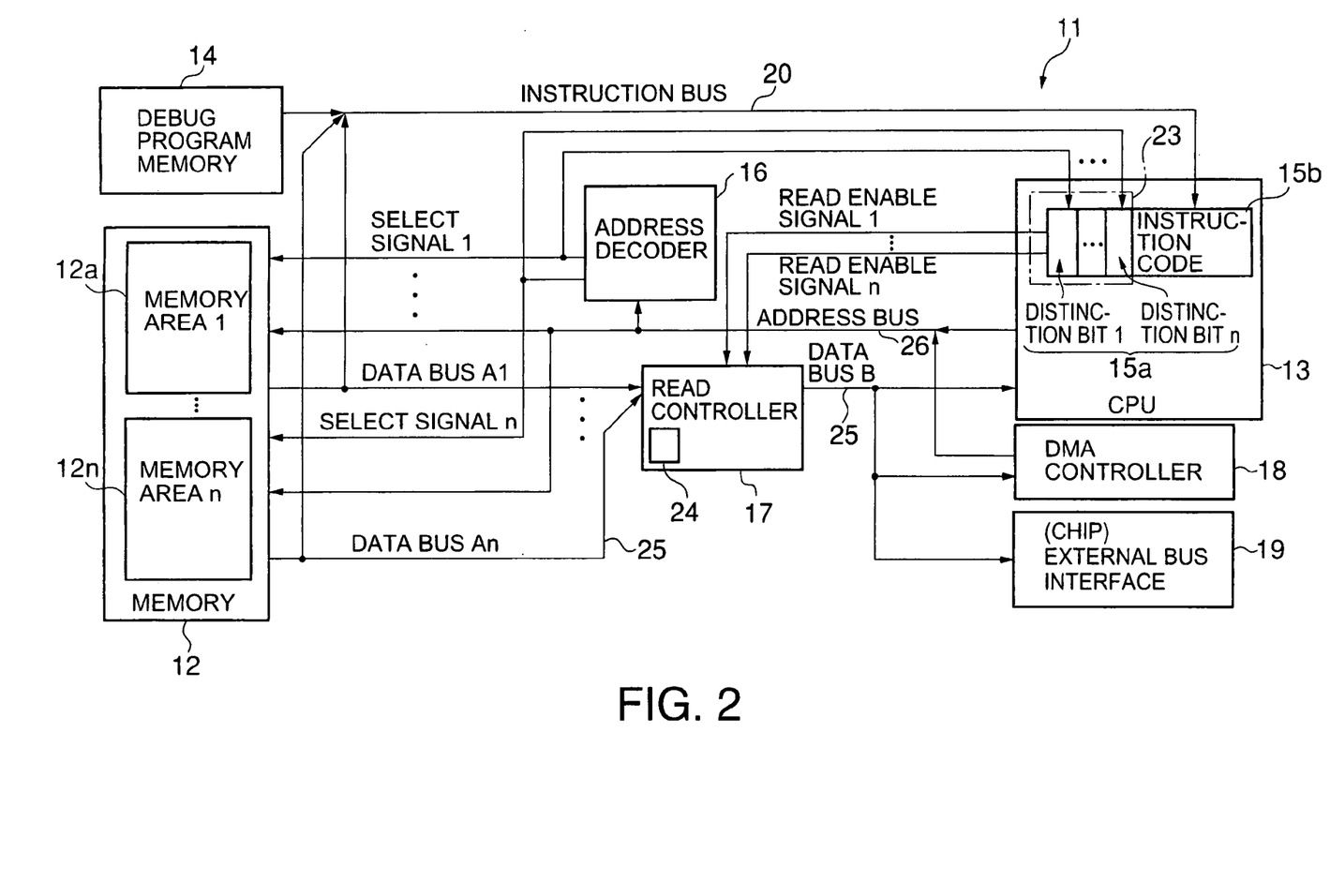
FIG. 2 is a block diagram showing a constitution of the microcomputer according to a second embodiment.

Next, a microcomputer according to a second embodiment will be described with reference to FIG. 2. In FIG. 2, constituting elements denoted with the same reference numerals as those of FIG. 1 show the constituting elements identical or corresponding to those of the microcomputer according to the first embodiment. Although not clearly shown in FIG. 2, a distinction unit 23 for confirming coincidence with addresses of distinction bits 1 to n, and thereafter outputting read enable signals 1 to n to a read access controller 24 of a read controller 17 is disposed in a CPU 13.

Programs are stored together with distinction bits in memory areas 12a to 12n. Selection signals 1 to n sent from an address decoder 16 are input into a memory 12, and is also input into the CPU 13, and distinction bits 1 to n added to the instructions from a debug program memory 14 are distinguished from one another. When the distinction unit 23 judges coincidence of the selection signal 1 with the distinction bit 1 to that of the selection signal n with the distinction bit n, the access to one of the respective memory areas 12a to 12n is permitted. The access to the area in which the distinction unit 23 does not detect the coincidence is not permitted.

Accordingly, programs 22a to 22n stored in the respective memory areas 12a to 12n are read into the CPU 13, DMA controller 18, chip external bus interface 19 or the like via the read controller 17. A microcomputer 11 according to the second embodiment has a constitution in which the distinction unit 23 is disposed in the CPU 13. An operation will be schematically described hereinafter.

An address bus 26 connected to the memory 12 from the CPU 13 is also connected to the address decoder 16. The address decoder 16 outputs the selection signals 1 to n to the memory areas 12a to 12n of the memory 12, and also outputs the same selection signals 1 to n to the distinction unit 23 of the CPU 13. When the distinction unit 23 judges the coincidence of the distinction bit with the selection signal, the read enable signals 1 to n are output to the read controller 17, data is read via data buses A1 to An, and subsequently the read data is supplied to one of the CPU 13, the DMA controller 18, and the chip external bus interface 19 via a data bus B.

The constitution of the microcomputer according to the second embodiment has been described above mainly in accordance with the operation. In the second embodiment, it has been described that the distinction unit 23 is disposed in the CPU 13, but as described in the first embodiment, the distinction unit 23 may be disposed in the address decoder 16, the read controller 17, or the DMA controller 18. It is to be noted that the present invention is not limited to the above-described embodiment, and can be variously modified.

Third Embodiment

Figure 3:
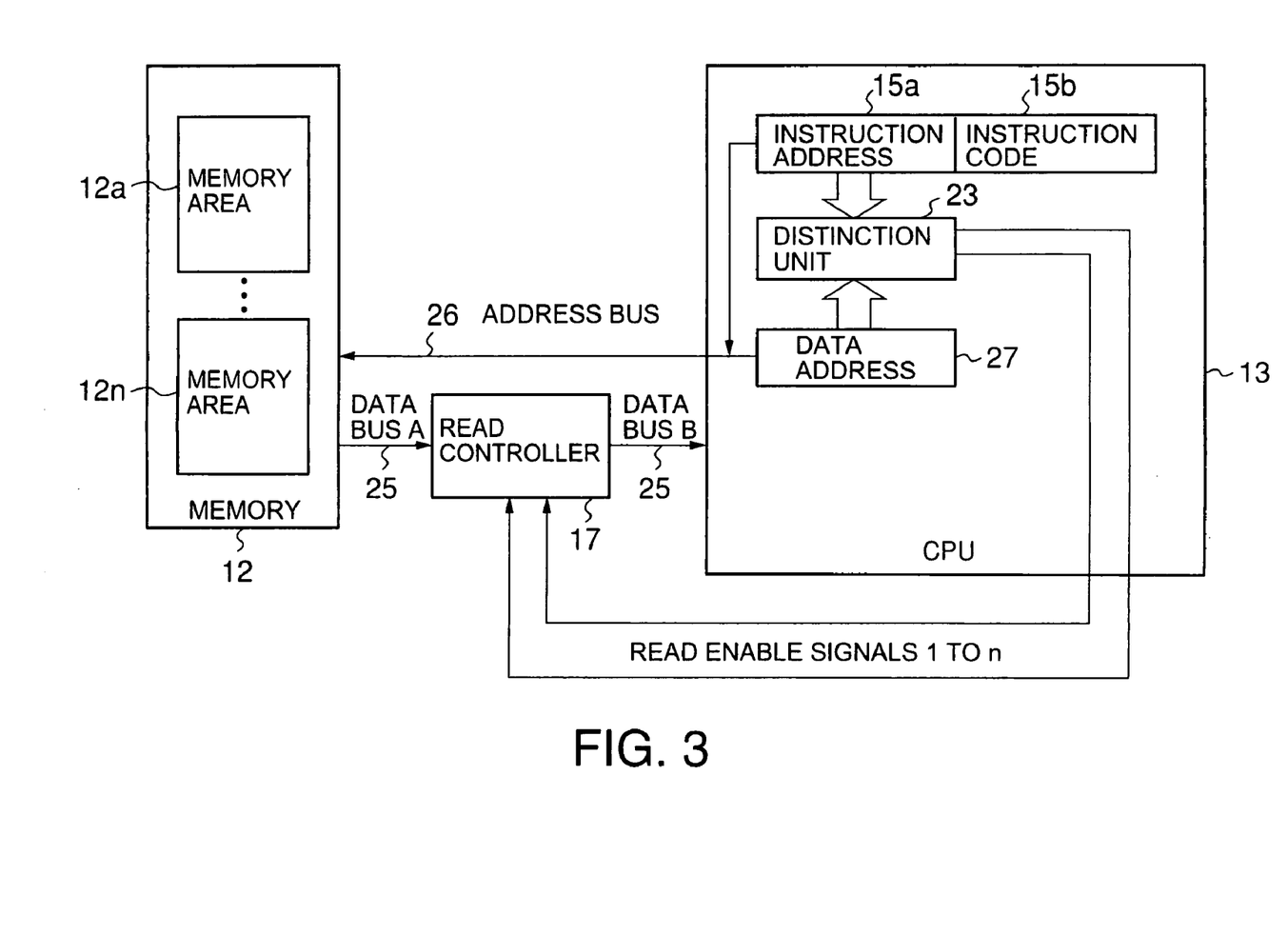
FIG. 3 is a block diagram showing a constitution of the microcomputer according to a third embodiment.

Next, a microcomputer according to a third embodiment which is a simplest constitution in the case of use of an address as a distinction bit will be described with reference to FIG. 3. In the microcomputer according to the third embodiment shown in FIG. 3, as compared with the microcomputer of the second embodiment shown in FIG. 2, the debug program memory 14, the DMA controller 18, and chip external interface 19 do not have to be disposed, and the distinction unit in a CPU 13 is constituted to distinguish an instruction address 15a and a data address 27. That is, the data address 27 corresponds to any of the distinction bits 21a to 21n shown in FIG. 1, and the distinction bits in the first embodiment include the instruction address 15a and data address 27.

An operation of the microcomputer according to the third embodiment will be described. When a predetermined instruction is set into the CPU 13, the operation differs depending on whether or not this instruction is a simple instruction to execute a process, or an access instruction to program memory areas 12a to 12n of a memory 12. In the case of the simple instruction to execute the process, the process is executed as such. In the case of the access instruction to the memory area, since the instruction is a program read instruction, it is judged whether or not the memory area to be accessed is a predetermined memory area.

In this case, the distinction unit 23 in the CPU 13 judges whether the instruction address 15a with an instruction code 15b stored therein and the data address 27 into which the instruction code 15b is read, are read from the same region or not. When the distinction unit 23 in the CPU 13 judges that the instruction code 15b is read from the same region, read enable signals 1 to n are output to a read controller 17, and data is read via a data bus 25.

In the microcomputer according to the third embodiment, it has been described that the distinction unit 23 is disposed in the CPU 13, but as described in the first embodiment shown in FIG. 1, the distinction unit 23 may be disposed in the read controller 17, or the memory 12.

Fourth Embodiment

Figure 4:
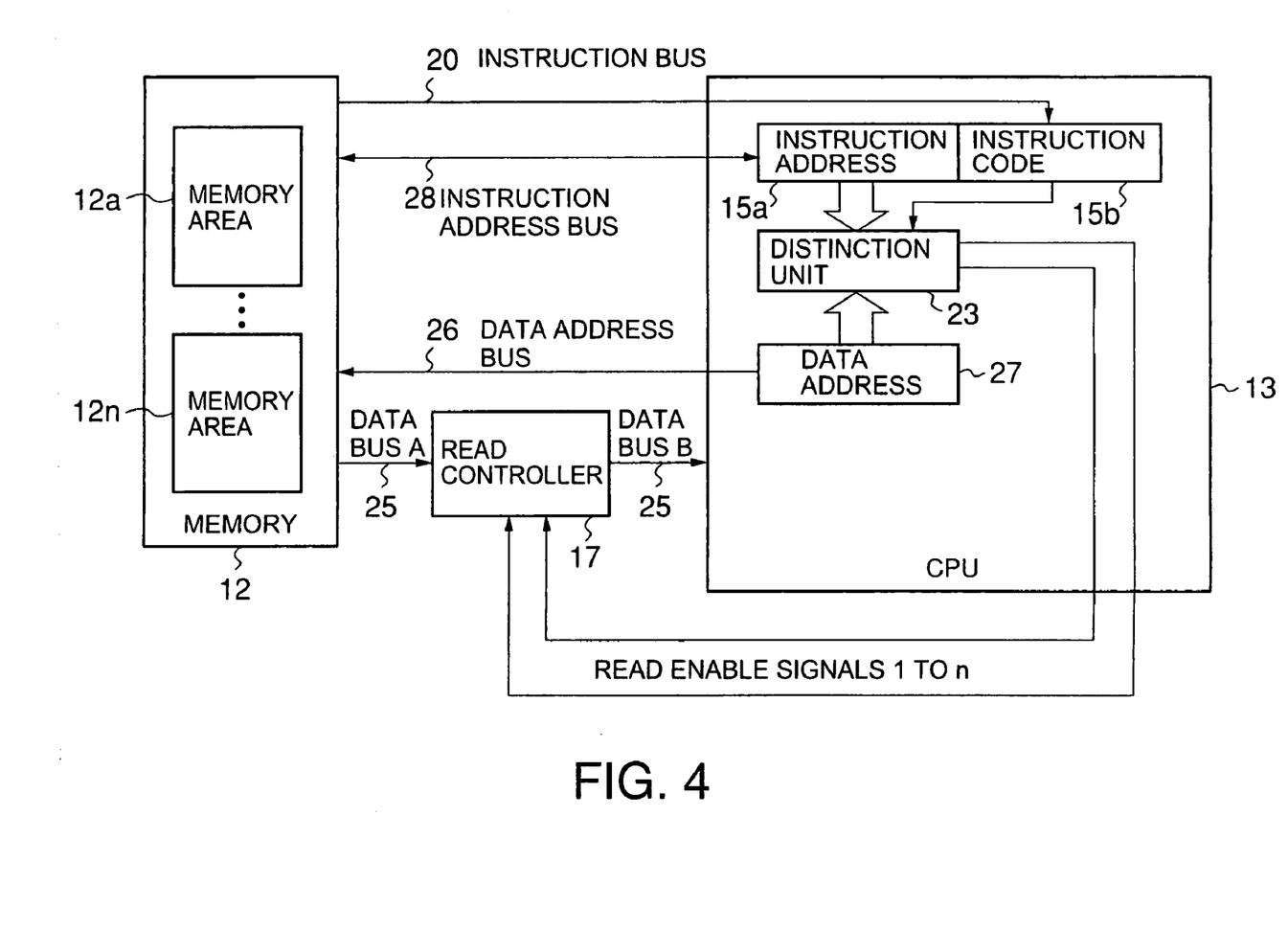
FIG. 4 is a block diagram showing a constitution of the microcomputer according to a fourth embodiment.

Next, a microcomputer according to a fourth embodiment will be described with reference to FIG. 4. As shown in FIG. 4, the microcomputer of the fourth embodiment shows a constitution example in which the data bus 25 and the address bus 26 of the microcomputer according to the third embodiment is divided into an instruction address bus 28/instruction bus 20 for an instruction code, and a data address bus 26/data bus 25 for data.

In the same manner as in the third embodiment, distinction unit 23 in a CPU 13 judges whether or not an instruction address 15a having an instruction code 15b stored therein, and a data address into which the instruction code 15b is read are read from the same region. When it is judged that the addresses are read from the same region, read enable signals 1 to n are output to a read controller 17, and data is read via the data bus 25.

Also in the microcomputer according to the fourth embodiment, it has been described that the distinction unit 23 is disposed in the CPU 13, but as described in the first embodiment shown in FIG. 1, the distinction unit may be disposed in the read controller 17, or the memory 12.

Fifth Embodiment

A microcomputer according to a fifth embodiment has a constitution in which a debug program memory, address decoder, DMA controller, and chip external bus interface are added to the constitution of the microcomputer according to the fourth embodiment shown in FIG. 4 including the memory 12, CPU 13, and read controller 17.

Figure 5:
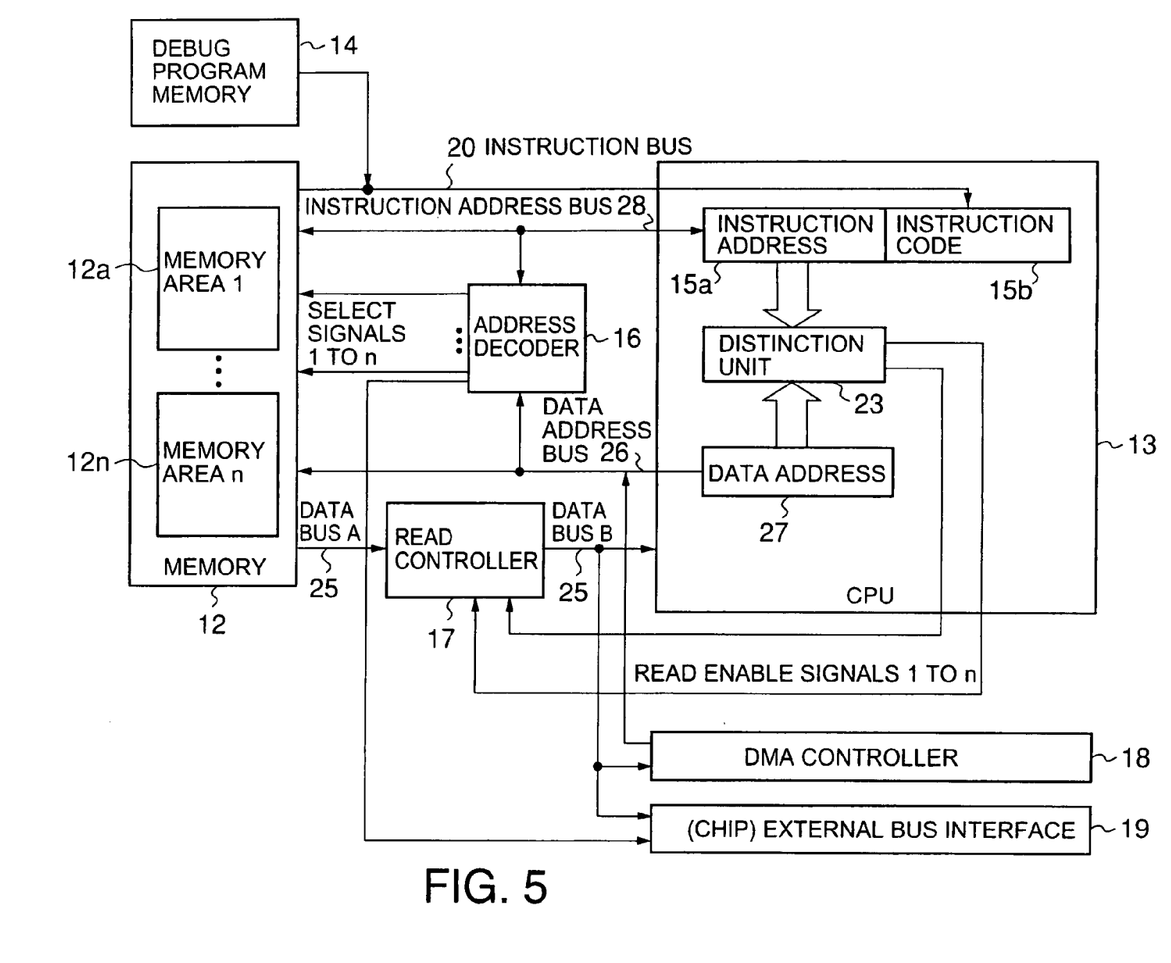
FIG. 5 is a block diagram showing a constitution of the microcomputer according to a fifth embodiment.

Concretely, as shown in FIG. 5, the microcomputer of the fifth embodiment comprises: a debug program memory 14 which allows an instruction bus 20 to hold a debug program; a DMA controller 18 which outputs an address control signal to a address bus 26 based on a read control signal supplied from a read controller 17 via a data bus B 25; and a chip external bus interface 19 which makes possible an access to the outside of a chip based on signals from an address decoder 16 and the read controller 17.

Figure 6:
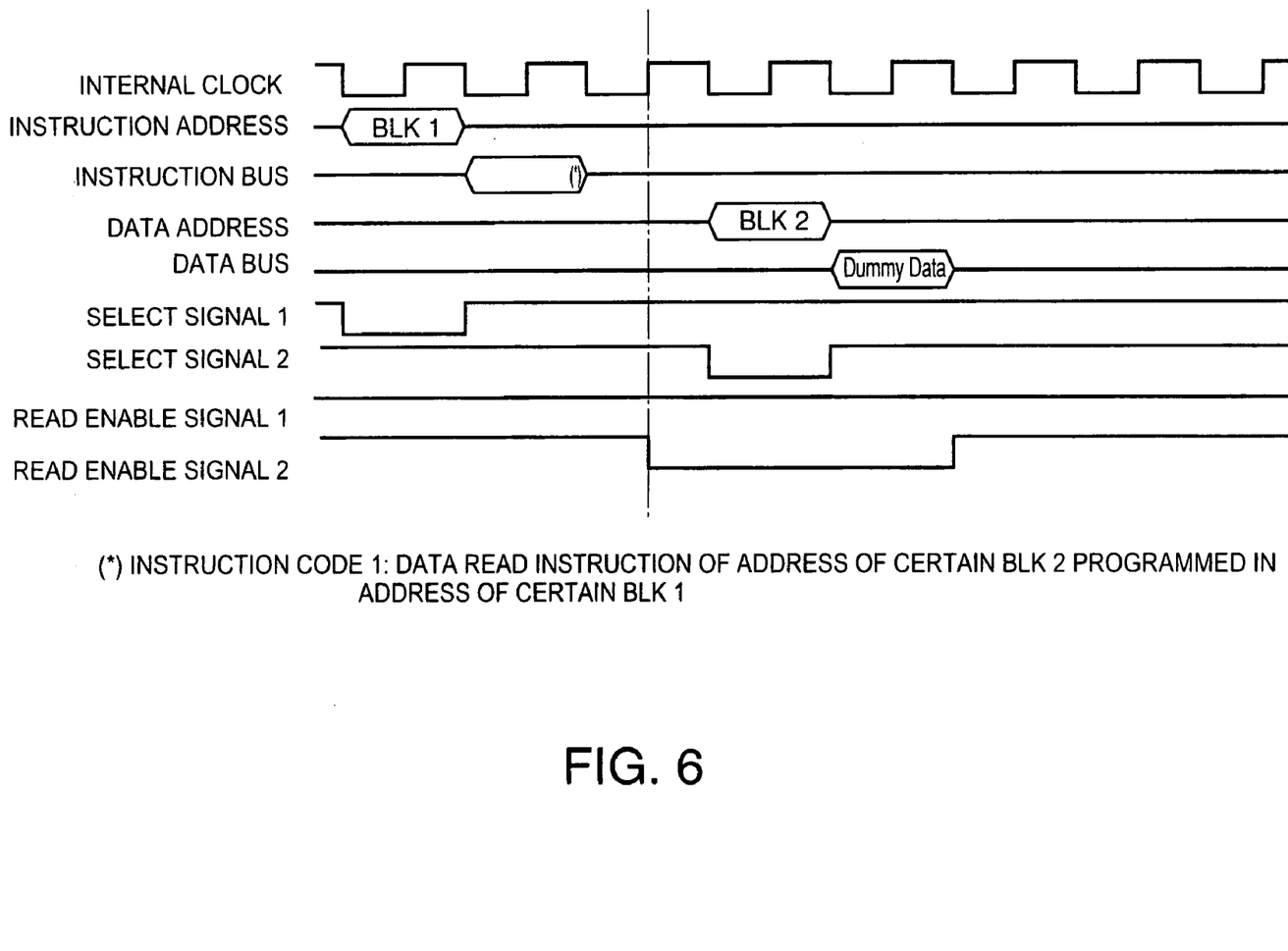
FIG. 6 is a timing chart showing an operation of the microcomputer according to the fifth embodiment.
Figure 7:
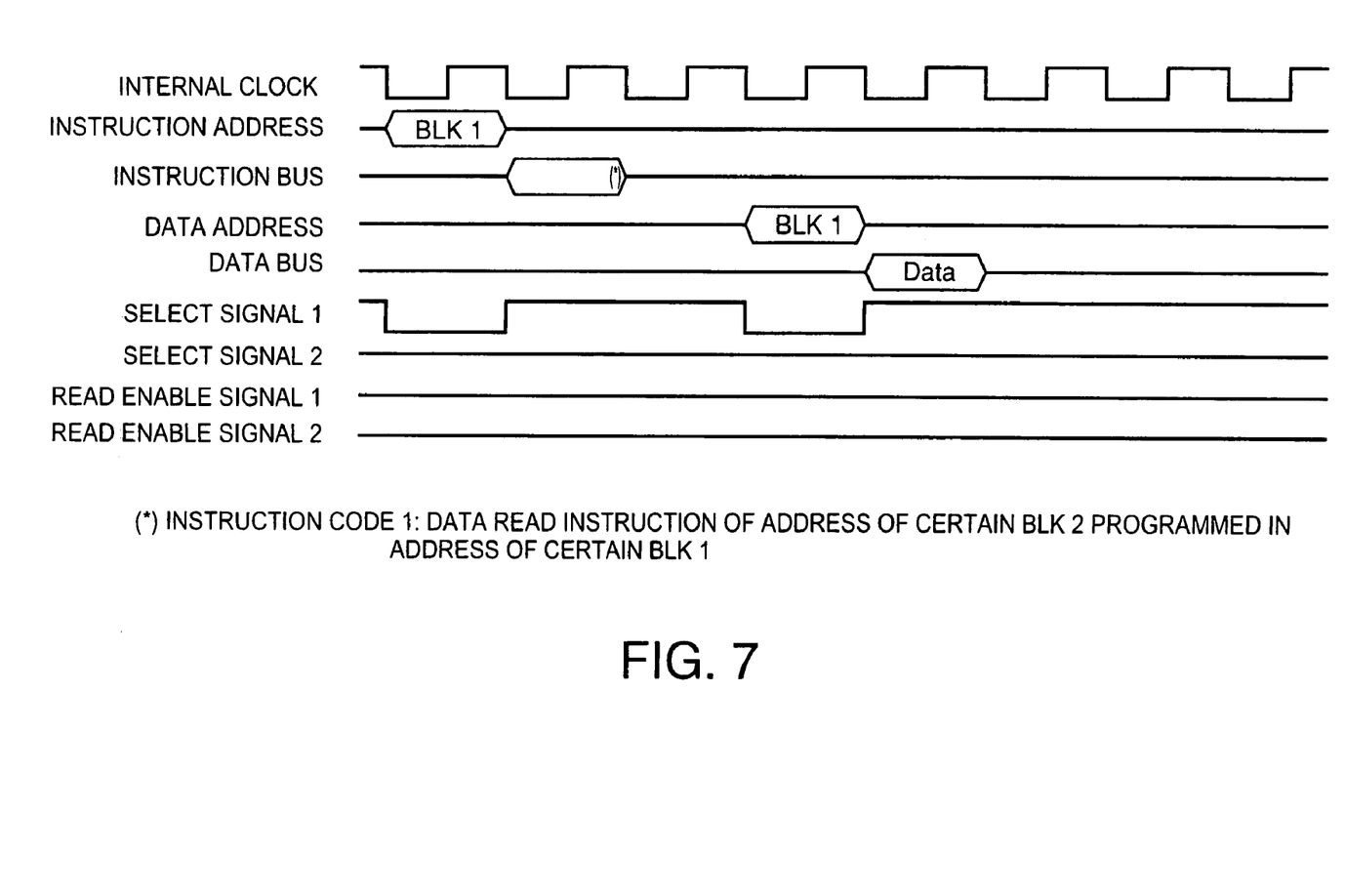
FIG. 7 is a timing chart showing the operation of the microcomputer according to the fifth embodiment.
Figure 8:
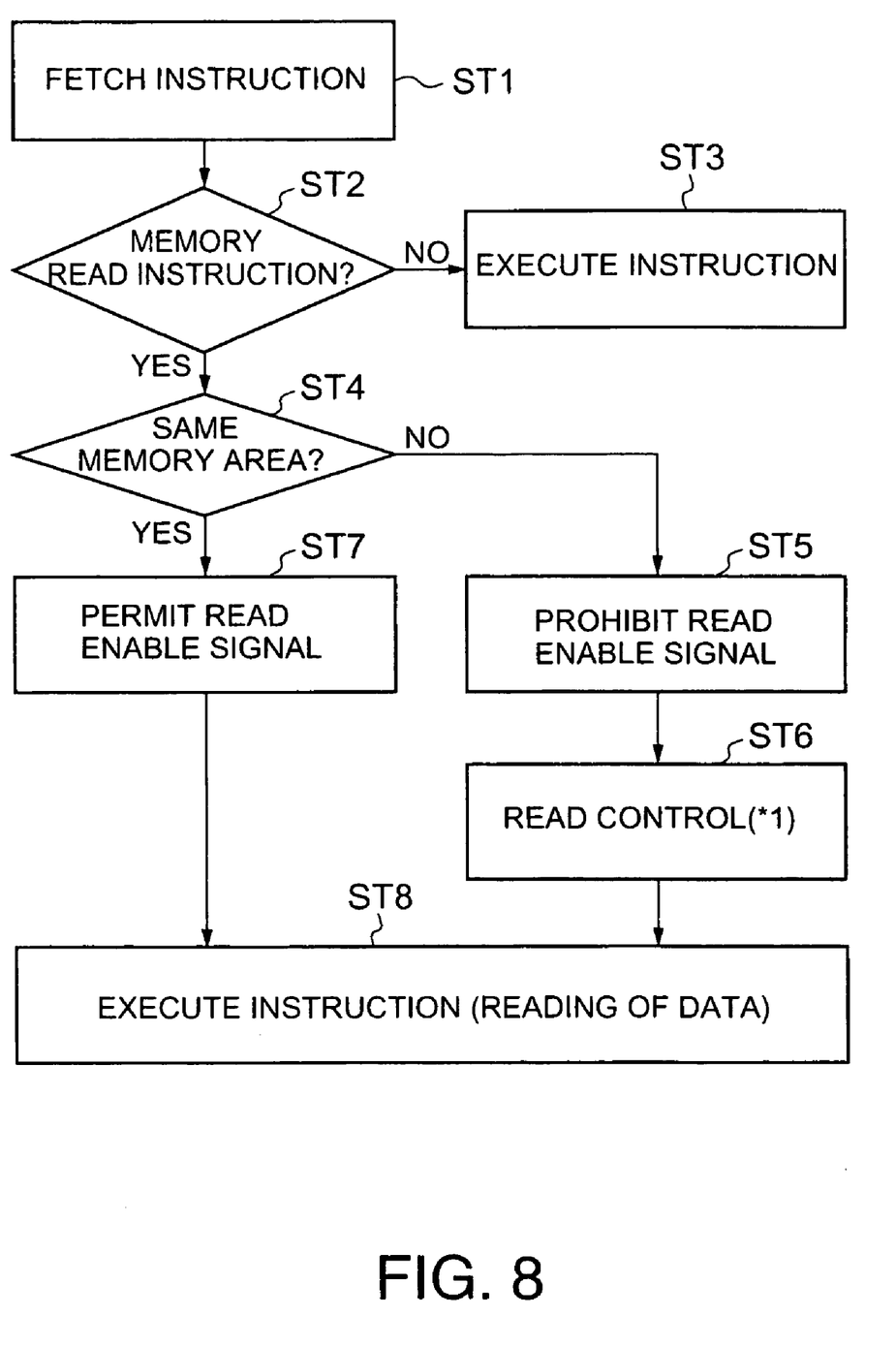
FIG. 8 is a flowchart showing the operation of the microcomputer according to the fifth embodiment.

An operation of the microcomputer according to the fifth embodiment shown in FIG. 5 will be described with reference to FIGS. 6 to 8. FIGS. 6 and 7 show timing charts of the microcomputer of the fifth embodiment, and FIG. 8 shows a flowchart showing the operation of the hardware constitution of FIG. 5. FIGS. 6 and 7 show the operation in the case of an instruction code 1 in which an instruction sent to a CPU 13 from the debug program memory 14 via the instruction bus 20 is a data read instruction of an address of a certain block 2 programmed in an address of a certain block 1, FIG. 6 shows a case where a read enable signal 2 prohibits reading, and FIG. 7 shows a case where the read enable signal 2 permits the reading.

In FIG. 6, an internal clock is a clock signal inherent in a system, and a process in the system is permitted based on the clock signal. An instruction address 15a input into the CPU 13 via an instruction address bus 28 is a block 1 (e.g., memory area 1), and an instruction code 15b input via the instruction bus 20 is an instruction code 1. With regard to a data address 27 by a read instruction of the instruction code 1, in the case of a block 2 (e.g., a memory area n), when contents of the instruction indicate an access to stored data, an instruction bus shown in FIG. 6 is controlled in such a manner as to prohibit the reading, when the instruction address does not coincide with the data address.

Therefore, when the data address 27 is the block 2, the read enable signal 2 falls at a predetermined timing to prohibit the reading, and the read controller 17 disposed in the data bus 25 prevents, for example, a program stored by sending dummy data from being read into the CPU 13.

On the other hand, in the timing chart shown in FIG. 7, for example, an instruction code instructed to be read is not an access to a program storage area, and is simply execution of an instruction. In this case, even when the instruction address is a block 1, and the data address is a block 2, a read enable signal 2 does not fall in order to prohibit the reading. Therefore, data is output to the data bus 25.

An operation based on hardware in the microcomputer of FIG. 5 which operates at the above-described timing will be described with reference to the flowchart of FIG. 8. In step ST1 of FIG. 8, in the CPU 13, an instruction which is read out from, for example, memories or the like is fetched via the instruction bus 20. In step ST2, it is judged whether or not contents of an instruction indicate a memory read instruction by an instruction code included in the instruction code 15b. When it is judged that the instruction is not the memory read instruction, the instruction is executed in step ST3. In this case, in the timing chart shown in FIG. 7, the read enable signal 2 does not change, and the reading is not prohibited even when the instruction address does not coincide with the data address.

When it is judged in the step ST2 that the fetched instruction is a memory read instruction, it is judged in step ST4 whether or not a memory area in which an object to read is stored is the same. Concretely, it is judged whether or not the instruction address 15a is the same as the data address 27. In the example of the timing chart shown in FIG. 6, a block BLK1 rises in the instruction address, and a block BLK2 rises in the data address. Therefore, in the instruction address 15a, for example, it is ordered to read the program stored in a memory area 12a. On the other hand, the distinguished data address 27 indicates that data stored, for example, in a memory area 12b is read. Therefore, the step ST4 advances to ST5, and the read enable signal 2 prohibits the reading by disagreement of the BLK1 with the BLK2 in the instruction address and data address in FIG. 6. The reading is controlled in step ST6, and, for example, dummy data is output in step ST8.

In this case, the block BLK1 rises in the data address in the timing chart shown in FIG. 7, the distinction unit 23 judges that the instruction address 15a coincides with the data address 27 of BLK1, the read enable signal is set to permission in step ST7 of FIG. 8. In the execution of the instruction in step ST8, an instruction to read normal data is executed.

In the above-described microcomputer according to the fifth embodiment, it has been described that the distinction unit 23 for judging whether or not the instruction address 15a and the data address 27 into which the instruction code 15b is read are read from the same region is disposed in the CPU 13, but the distinction unit 23 is not limited to the constitution in which the means is disposed in the CPU 13, and may be disposed in the address decoder 16, read controller 17, or DMA controller 18. These constitutions will be described hereinafter as microcomputers according to sixth to ninth embodiments shown in block diagrams of FIGS. 9 to 12.

Sixth Embodiment

Figure 9:
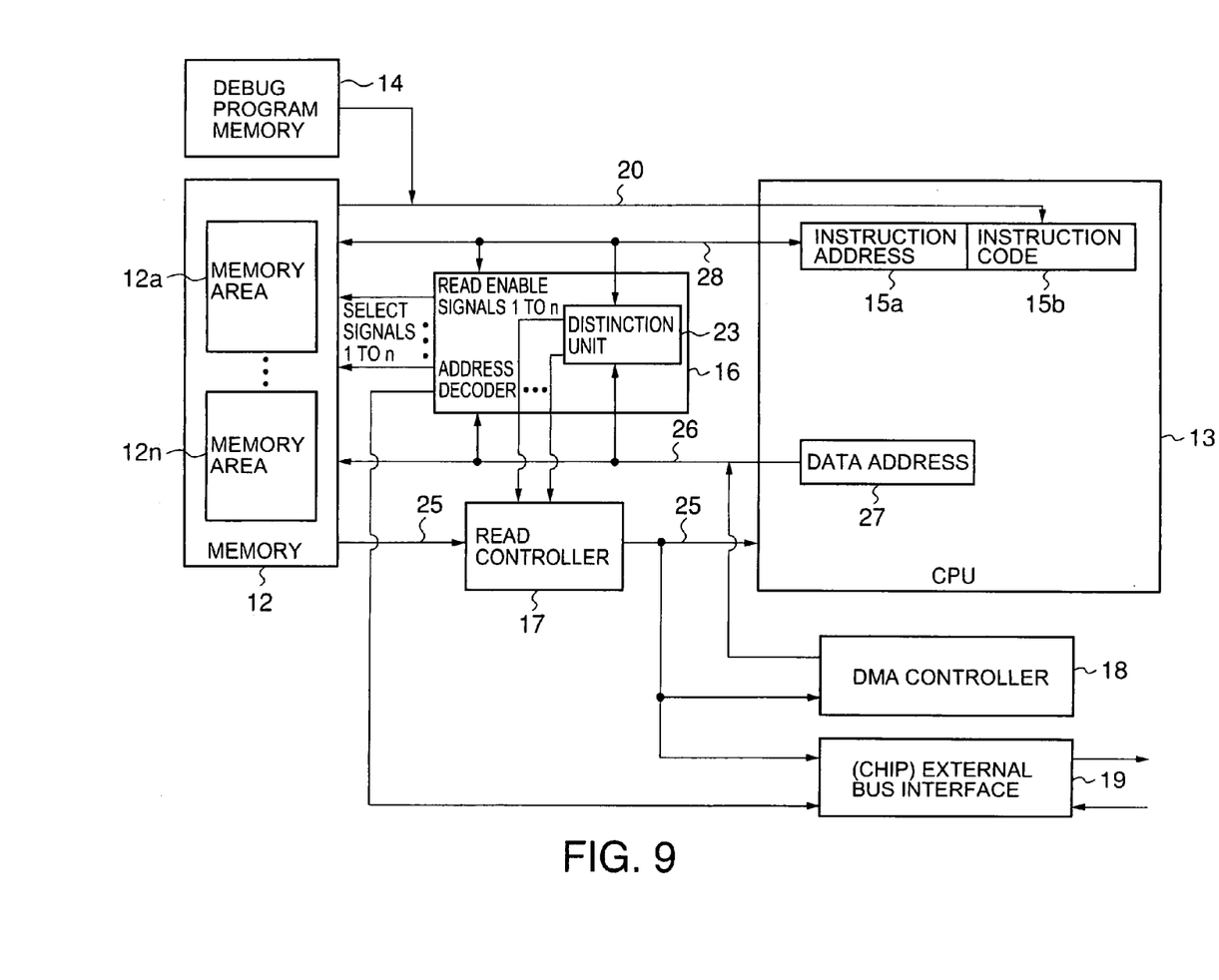
FIG. 9 is a block diagram showing a constitution of the microcomputer according to a sixth embodiment.

A microcomputer of a sixth embodiment shown in FIG. 9 has a constitution in which distinction unit 23 is disposed in an address decoder 16. An instruction including an instruction address 15a and an instruction code 15b is fetched in a CPU 13, and the instruction address 15a of the fetched instruction and a data address 27 into which the instruction is read are sent to a memory 12 via an instruction address bus 28 and a data address bus 26.

The distinction unit 23 disposed in the address decoder 16 distinguishes addresses of two address buses 28 and 26. When an instruction read object is data stored in the same memory area, read enable signals 1 to n are permitted. When the object is data stored in different memory areas, one of the read enable signals 1 to n is prohibited. The read enable signals 1 to n are output to a read controller 17, and the reading of the stored data sent to the CPU 13 from the memory 12 via a data bus 25 is permitted or prohibited.

Since concrete operations of the permission and prohibition of the reading of the memory stored data have been described with reference to FIGS. 6 to 8, redundant description is omitted.

Seventh Embodiment

Figure 10:
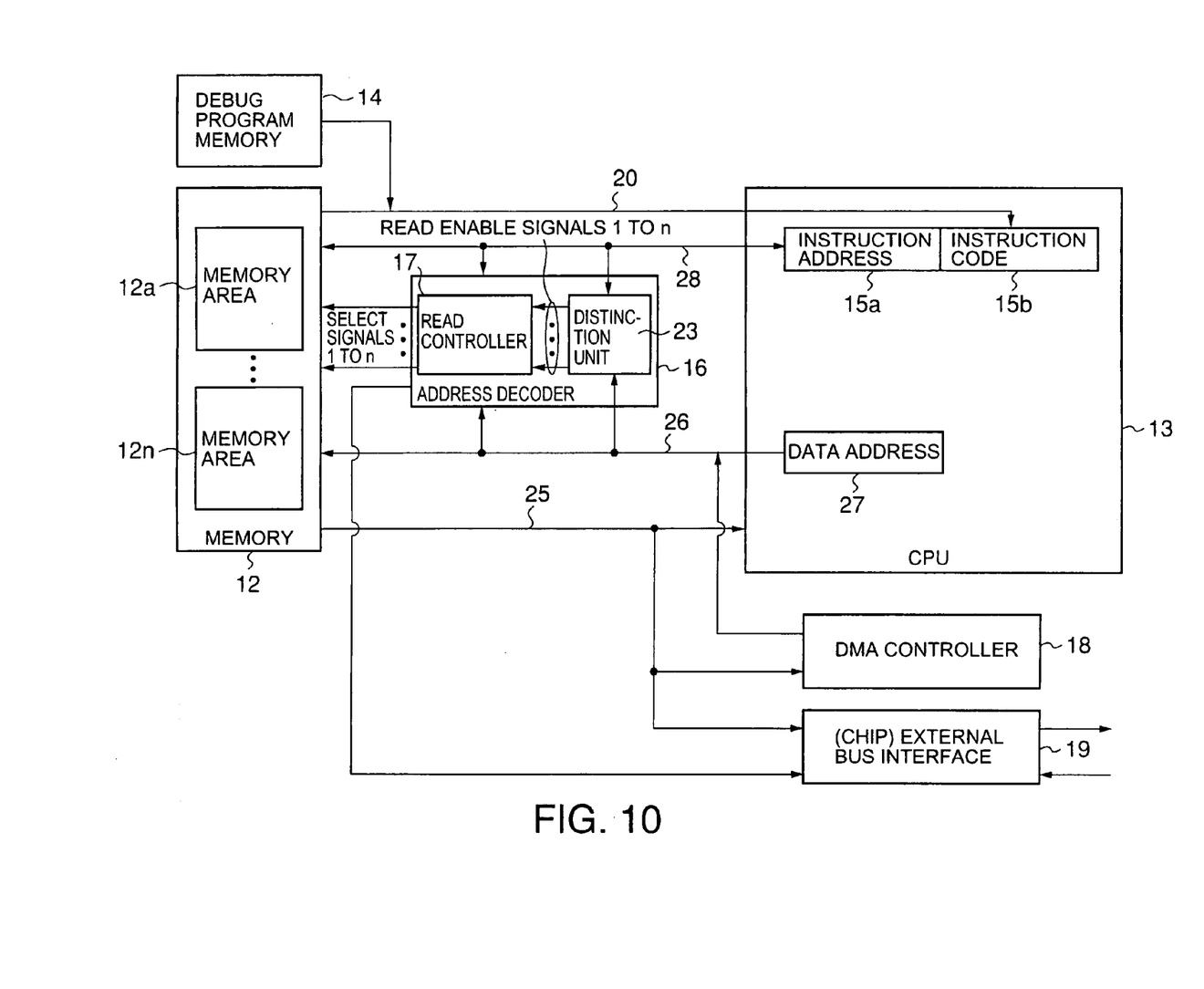
FIG. 10 is a block diagram showing a constitution of the microcomputer according to a seventh embodiment.

A microcomputer of a seventh embodiment shown in FIG. 10 also has a constitution in which distinction unit 23 is disposed in an address decoder 16. In this constitution, unlike a sixth embodiment shown in FIG. 9, a read controller 17 is disposed together with the distinction unit 23 in the address decoder 16.

In the microcomputer of the seventh embodiment, the distinction unit 23 distinguishes an instruction address 15a and a data address 27, and accordingly outputs read enable signals 1 to n to the 17, and the read controller 17 outputs selection signals 1 to n to a memory 12 based on the received read enable signals 1 to n. Therefore, the present embodiment is different from the other embodiments in that distinction results of the distinction unit 23 are sent as the selection signals 1 to n to the memory.

Eighth Embodiment

Figure 11:
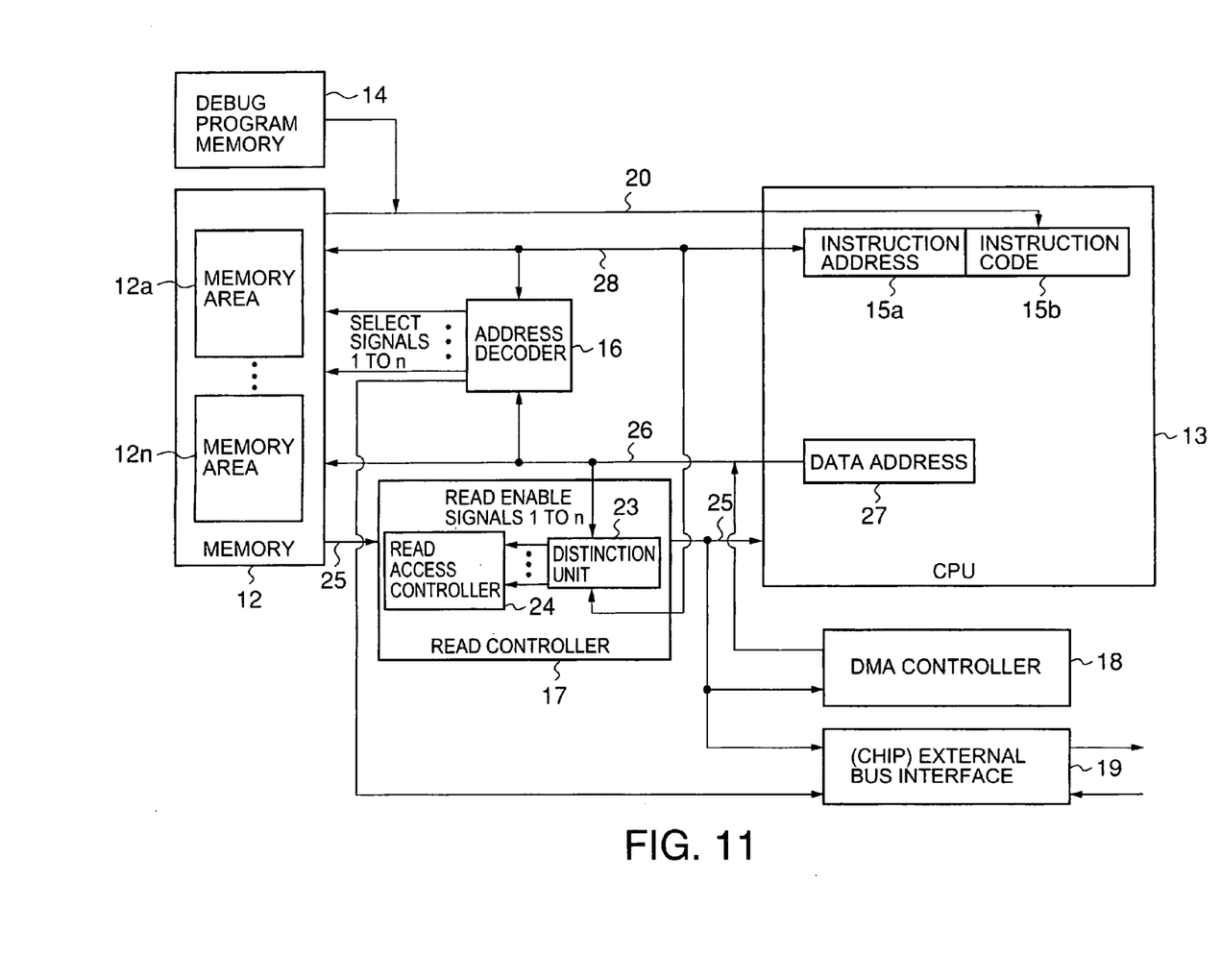
FIG. 11 is a block diagram showing a constitution of the microcomputer according to an eighth embodiment.

A microcomputer of an eighth embodiment shown in FIG. 11 has a constitution in which a distinction unit 23 is disposed in a read controller 17. An instruction including an instruction address 15a and an instruction code 15b is fetched in a CPU 13, and the instruction address 15a concerning the fetched instruction and a data address 27 into which the instruction is read are sent to a memory 12 via an instruction address bus 28 and a data address bus 26.

The distinction unit 23 disposed in the read controller 17 distinguishes addresses of two address buses 28 and 26. When an instruction read object is data stored in the same memory area, read enable signals 1 to n are permitted. When the object is data stored in different memory areas, one of the read enable signals 1 to n is prohibited. The read enable signals 1 to n are output to read access controller 24 disposed in the read controller 17, and the reading of the stored data sent to the CPU 13 from the memory 12 via a data bus 25 is permitted or prohibited.

Since concrete operations of the permission and prohibition of the reading of the memory stored data have been described with reference to FIGS. 6 to 8, redundant description is omitted.

Ninth Embodiment

Figure 12:
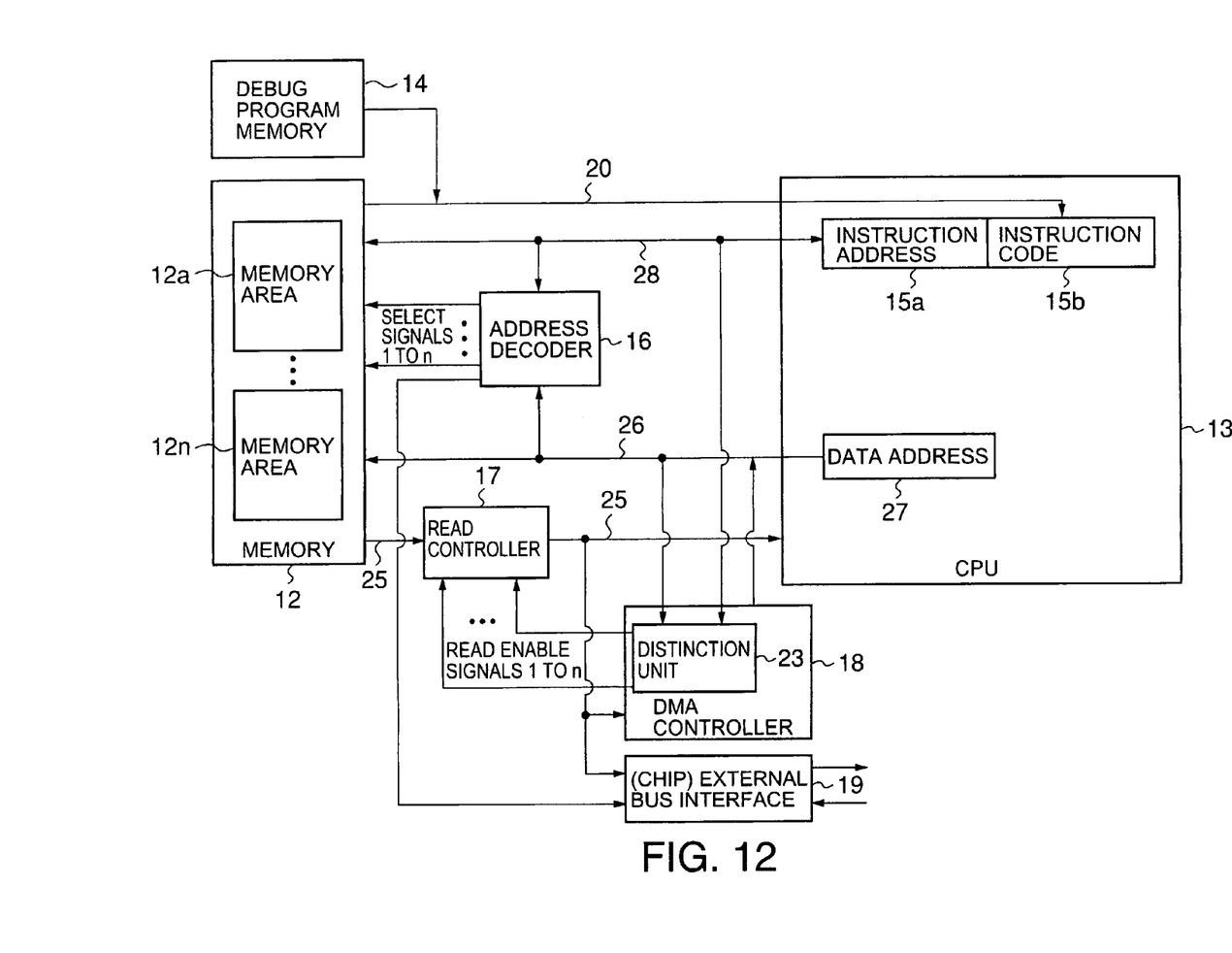
FIG. 12 is a block diagram showing a constitution of the microcomputer according to a ninth embodiment.

A microcomputer of a ninth embodiment shown in FIG. 12 has a constitution in which distinction unit 23 is disposed in a DMA controller 18. An instruction including an instruction address 15a and an instruction code 15b is fetched in a CPU 13, and the instruction address 15a concerning the fetched instruction and a data address 27 into which the instruction is read are sent to a memory 12 via an instruction address bus 28 and a data address bus 26.

The distinction unit 23 disposed in the DMA controller 18 distinguishes addresses of two address buses 28 and 26. When an instruction read object is data stored in the same memory area, read enable signals 1 to n are permitted. When the object is data stored in different memory areas, one of the read enable signals 1 to n is prohibited. The read enable signals 1 to n are output to a read controller 17, and the reading of the stored data sent to the CPU 13 from the memory 12 via a data bus 25 is permitted or prohibited.

Since concrete operations of the permission and prohibition of the reading of the memory stored data have been described with reference to FIGS. 6 to 8, redundant description is omitted.

According to the microcomputer of the above-described embodiment, the internal memory is divided into memory areas for programs, and distinction unit for distinguishing each program by the distinction bit (e.g., address, etc.) is disposed. Therefore, there can be provided a microcomputer capable of securing securities of programs even in a case where different users install a plurality of different programs into the memory.

What is claimed is:

1. A microcomputer comprising:
   a memory which stores a predetermined program;
   a CPU which reads the program stored in the memory based on a predetermined instruction to perform a predetermined calculation;
   a read controller which controls reading of the program from the memory;
   a plurality of memory areas which are a plurality of portions provided by dividing the memory and which each store respective programs being different from one another and having different distinction marks in the portions, respectively;
   a distinction unit that, by using different distinction codes that are internally generated from the predetermined instruction and included therein and by comparing the distinction mark of the memory area with the distinction code included in the predetermined instruction, distinguishes that a specified memory area having a certain distinction mark being consistent with a corresponding distinction code, is a memory area storing a program to be read; and
   a read access controller that, when the distinction unit distinguishes an agreement of the distinction mark and the distinction code, enables the reading of the program from the distinguished memory area, and when the distinction unit distinguishes a disagreement of the distinction mark and the distinction code, prohibits the reading of the program from the distinguished memory area in which the program is stored.

2. The microcomputer according to claim 1, wherein the predetermined instruction constituting a basis of the predetermined calculation in the CPU comprises an instruction address and an instruction code which are the distinction bits,
   the distinction unit distinguishes a data address into which the instruction code sent to the memory from the CPU is read, and the instruction address, and
   the read access controller permits the reading of the program in the case of the reading from the same memory area, and regards the reading of different programs to prohibit the reading of another program in the case of the reading from different memory areas based on the distinction result of the distinction unit.

3. The microcomputer according to claim 2, wherein an address bus is disposed between the data address in the CPU and the memory, the distinction unit is disposed in the CPU, the read access controller is disposed in the read controller connected between the memory and the CPU via a data bus, and the distinction unit outputs a plurality of read enable signals as many as the plurality of memory areas to the read controller.

4. The microcomputer according to claim 2, wherein an instruction address bus is disposed between the instruction address in the CPU and the memory, a data bus is disposed between the instruction code of the CPU and the memory, and a data address bus is disposed between the data address in the CPU and the memory.

5. The microcomputer according to claim 4, wherein the distinction unit is disposed in the CPU, the read access controller is disposed in the read controller connected between the memory and the CPU via a data bus, and the distinction unit outputs a plurality of read enable signals as many as the plurality of memory areas to the read controller.

6. The microcomputer according to claim 4, wherein the distinction unit and the read access controller are disposed in the read controller connected between the memory and the CPU via a data bus, the instruction address is supplied to the read access controller in the read controller via the instruction address bus, the data address is supplied via the data address bus, and the read access controller produces a plurality of read enable signals based on the supplied instruction address and the data address to permit the reading of the same program and to prohibit the reading of the other program.

7. The microcomputer according to claim 4, further comprising: an address decoder which permits an access to an address space of the memory by an address at a time when the instruction is received, wherein the distinction unit is disposed in the address decoder, the read access controller is disposed in the read controller, the instruction address is supplied to the distinction unit in the address decoder via the instruction address bus, and the data address is supplied via the data address bus.

8. The microcomputer according to claim 4, further comprising: a direct memory access controller which directly controls an access between an internal memory and an external memory, wherein the distinction unit is disposed in the direct memory access controller, and the read access controller is disposed in the read controller.

9. The microcomputer according to claim 1, further comprising: an address decoder which permits an access to an address space of the memory by an address at a time when the instruction is received; and a read controller which controls the reading of the program from the memory at a time when the access to the memory is permitted, wherein the plurality of memory areas store each of a plurality of programs having distinction bits which are disposed in the memory and which differ with the programs for each program, the distinction unit distinguishes the memory areas in which the respective programs are stored using the distinction bits which differ with the programs, and the read access controller controls the reading of the program in such a manner as to permit an access to the memory area in which the program is stored, only when the distinction bit is judged to belong to the corresponding program, and to prohibit an access to a memory area in which the other program is stored by the distinction bit for the certain program.

10. The microcomputer according to claim 9, wherein the distinction unit is disposed in the CPU, and the read access controller is disposed in the read controller.

11. The microcomputer according to claim 9, wherein the distinction unit is disposed in the address decoder, and the read access controller is disposed in the read controller.

12. The microcomputer according to claim 9, wherein the distinction unit and the read access controller are disposed in the read controller.

13. The microcomputer according to claim 9, further comprising: a direct memory access controller which directly controls an access between an internal memory and an external memory, wherein the distinction unit is disposed in the direct memory access controller, and the read access controller is disposed in the read controller.

14. A microcomputer comprising:

a memory which stores a predetermined program;

a CPU which reads the program stored in the memory based on a predetermined instruction to perform a predetermined calculation;

an address decoder which permits an access to an address space of the memory by an address at a time when the instruction is received;

a read controller which controls reading of the program from the memory at a time when the access to the memory is permitted;

a plurality of memory areas to store a plurality of programs having distinction marks which are disposed in the memory and which differ with the programs for each of the programs;

a distinction unit for distinguishing the memory areas using distinction codes that are internally generated from the predetermined instruction and included therein and by comparing the distinction mark of the memory area with the distinction code included in the predetermined instruction, for distinguishing that a specified memory area having a certain distinction mark being consistent with a corresponding distinction code, is a memory area storing a program to be read; and a read access controller that, when the distinction unit distinguishes an agreement of the distinction mark and the distinction code, enables the reading of the program from the distinguished memory area, and when the distinction unit distinguishes a disagreement of the distinction mark and the distinction code, prohibits the reading of the program from the distinguished memory area in which the program is stored by the distinction code for the certain program.

15. The microcomputer according to claim 14, wherein the distinction unit is disposed in the CPU, and the read access controller is disposed in the read controller.

16. The microcomputer according to claim 14, wherein the distinction unit is disposed in the address decoder, and the read access controller is disposed in the read controller.

17. The microcomputer according to claim 15, wherein the distinction unit and the read access controller are disposed in the read controller.

18. The microcomputer according to claim 15, further comprising: a direct memory access controller which directly controls an access between an internal memory and an external memory, wherein the distinction unit is disposed in the direct memory access controller, and the read access controller is disposed in the read controller.

* * * * *